Oct. 6, 1959      R. L. BUTZKO      2,907,069
VACUUM MOLDING MACHINE
Filed Feb. 2, 1956      3 Sheets-Sheet 1
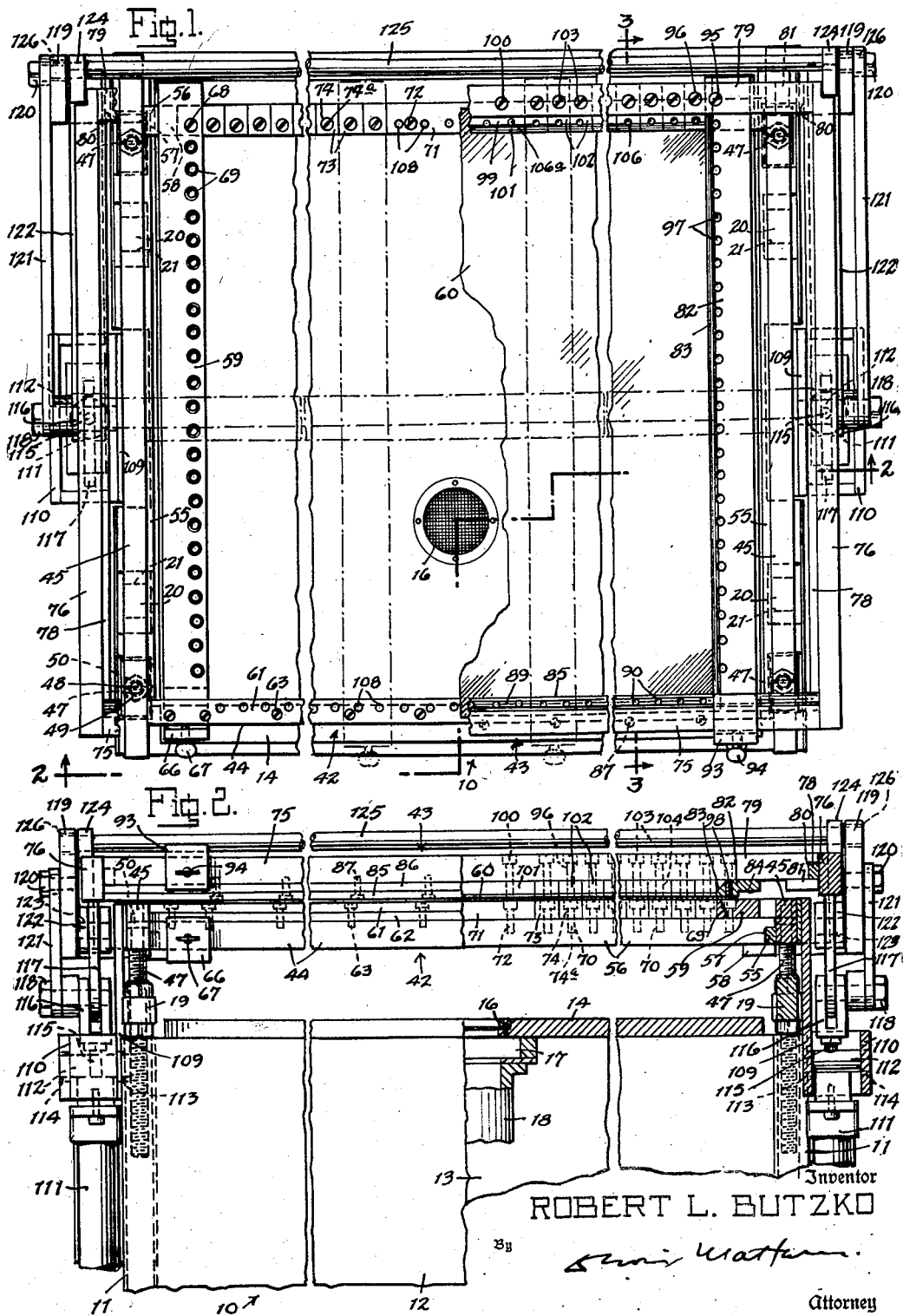
Inventor
ROBERT L. BUTZKO
By
Attorney Oct. 6, 1959 R. L. BUTZKO 2,907,069
VACUUM MOLDING MACHINE
Filed Feb. 2, 1956 3 Sheets-Sheet 2
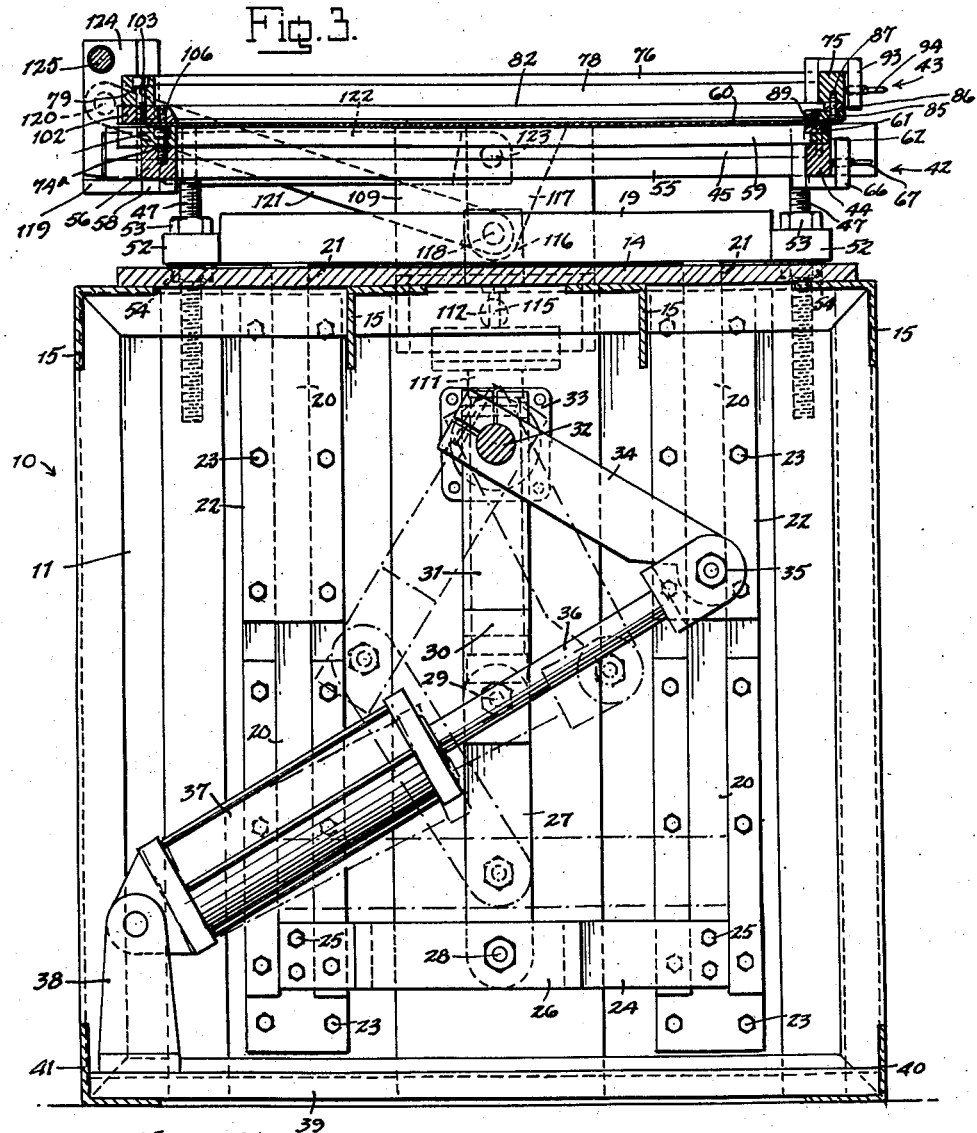
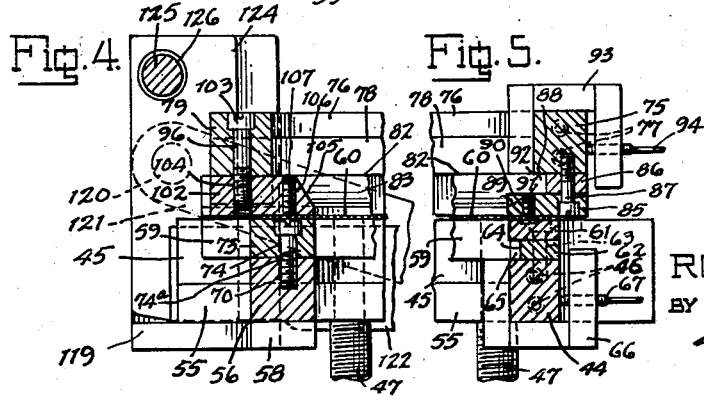
Inventor
ROBERT L. BUTZKO
BY
Attorney

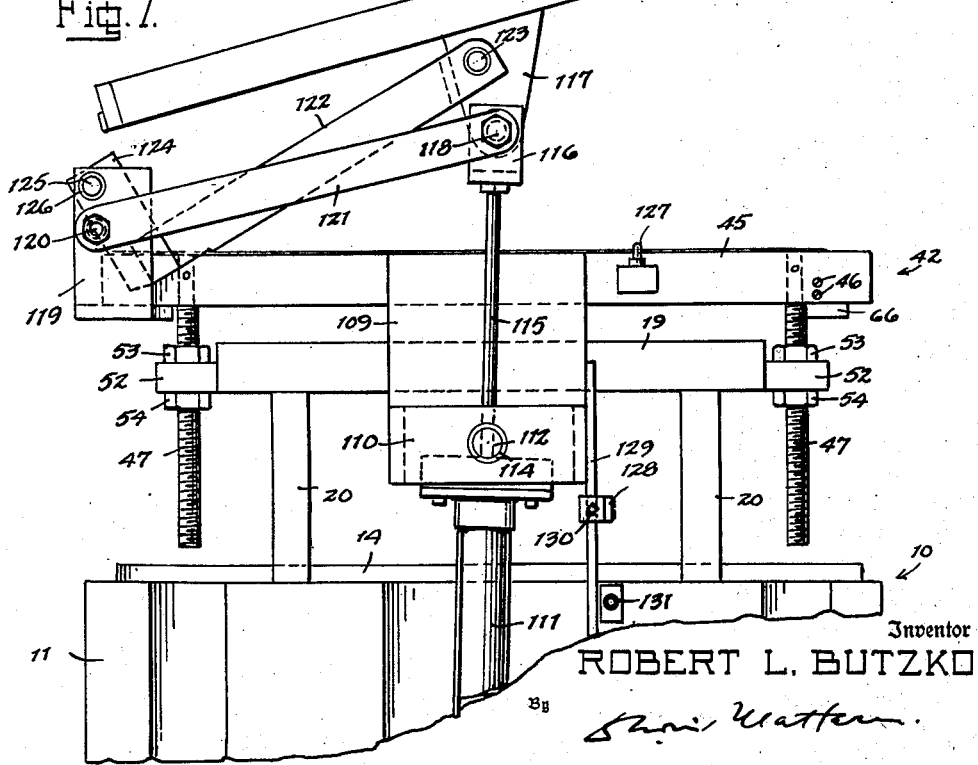

United States Patent Office 2,907,069
Patented Oct. 6, 1959

2,907,069

VACUUM MOLDING MACHINE

Robert L. Butzko, Bridgeport, Conn., assignor, by mesne assignments, to National Cleveland Corporation, Cleveland, Ohio, a corporation of Ohio Application February 2, 1956, Serial No. 563,019

4 Claims. (Cl. 18—19)

The present invention relates to a vacuum molding machine, particularly of the type as disclosed in my co-pending application Serial Number 414,653, filed March 8, 1954, now Patent No. 2,836,852, which is adapted for the molding of flat thermo-plastic sheets, to produce from such sheets molded relief shapes in conformity to molds of either projection or male type, or cavity or female type.

It is a particularly object of the present invention to provide an improved clamping frame for the securing of the thermo-plastic sheets, and wherein the frame is adapted for easy and rapid adjustment for various sized sheets.

A further object is to provide a frame including upper and lower frame parts in which the sheets are adapted to be clamped, the upper part being adapted for automatic opening and closing, the opening position being such as to provide a relatively wide clear space, both at the front and the back of the frame, for the insertion of sheets to be molded and for the removal of the completed molded product.

A still further object is to provide a clamping frame in which the clamping action is self-adjusting, to accommodate plastic sheets of varying thickness, and wherein a substantially uniform clamping action is obtained entirely around the margin of the sheet.

Another object is to provide a clamping frame adapted for vertical draping movement in relation to a mold, and wherein the frame height with respect to the mold supporting platen, is adjustable to permit of the use of molds having an overall height substantially greater than the draping distance of the frame.

Other objects and advantages of the invention will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

Fig. 1 is a plan view of the frame with intermediate sections broken away, according to the illustrated exemplary embodiment of the invention, the frame being shown in closed clamping position, and the upper clamping frame part being partially broken away to show the lower clamping frame part;

Fig. 2 is a view partly in front elevation and partly in vertical section, taken along the line 2—2 of Fig. 1;

Fig. 3 is a transverse vertical sectional view, taken along the line 3—3 of Fig. 1;

Fig. 4 is a vertical sectional view on an enlarged scale, of the rearward portion of the clamping frame;

Fig. 5 is a vertical sectional view, also on an enlarged scale, of the forward portion of the clamping frame;

Fig. 6 is an end elevation showing the clamping frame in closed position and lowered into relation with the mold supporting platen; and Fig. 7 is an end elevation showing the clamping frame open and in raised relation to the mold supporting platen.

Referring to the drawings, the vacuum table part, designated generally as 10, is substantially similar to the vacuum table part as disclosed in the above referred to co-pending application, and in the complete vacuum molding machine is disposed forwardly of a heater unit supporting part carrying a heater unit which is adapted during a cycle of operation to be moved forwardly into superimposed relation to a thermo-plastic sheet carried in the clamping frame to heat the sheet and thereupon retracted, the heated sheet being thereupon molded by a vacuum mold, either by a draping action, in the case of a male mold, or a combination male and female mold, in which case the frame is moved downwardly to drape the sheet over the mold prior to the application of vacuum, which thereupon draws the sheet to the shape of the mold, or by initially placing the sheet directly upon the mold, in the case of a female mold, the application of vacuum drawing the sheet to the shape of the female mold. Inasmuch as the present improvements are particularly directed to the clamping frame and its operating means, illustration of the heater unit is not deemed necessary.

The vacuum table part 10 comprises a generally rectangular vertical enclosing wall consisting of end wall portions 11—11 and front and rear wall portions 12 and 13, a heavy gauge rectanguar top plate or platen 14 being supported at the upper side of the enclosing wall upon longitudinally extending angle iron beams 15 connected between the end walls. At a suitable point, preferably substantially centrally between the ends of the top plate, there is provided a screened vacuum opening 16 in communication with a manifold chamber 17 provided at the underside of the top plate, and to which there is connected a vacuum pipe 18 through which vacuum is supplied during each operative cycle through the automatic operation of suitable valves.

At each end of the vacuum table there is provided a transversely extending bar 19 upon which the ends of the clamping frame are mounted for vertical adjustment, as will presently more fully appear, each bar 19 being secured upon the upper ends of a pair of vertical slide bars 20—20 movable through slots 21—21 in the upper side of the table and which are guided in their vertical movement in guideways 22—22 secured upon the inner side of the respective end wall 11 by bolts 23.

The two slide bars 20 are connected at their lower ends by a cross bar 24 secured to the slide bars by bolts 25, a yoke member 26 being secured to the cross bar 24 to provide a pocket at its inner side in which the lower end of a link 27 is pivotally connected by a pivot bolt 28 located at the center point between the two slide bars 20 are secured in the cross bar and yoke member. The upper end of the link 27 is pivotally connected by a pivot bolt 29 to the yoke end 30 of a lever arm 31 secured at its upper end upon a crank shaft 32 extending longitudinally of the vacuum table centrally between the slide bars 20, this crank shaft being mounted at its ends in anti-friction bearing units 33 secured upon the end walls 11 and being preferably mounted at intermediate points in suitable hanger bearings (not shown). The link 27 and the lever arm 31 constitute a toggle leverage which, in the lowered position of the cross bar 24 and the slide bars 20 connected thereto, is in a substantially straight line position, as shown in full lines in Fig. 3, rotation of the crank shaft 32 in a clockwise direction actuating the toggle leverage to draw the cross bar and the slide bars upwardly to elevate the bars 19 at the upper side of the vacuum table.

Rotation is imparted to the crank shaft by means of a crank arm 34 secured at a suitable point to the crank shaft 32 and pivotally connected at its other end by a forked pin connection 35 to the piston rod 36 of an air cylinder 37 pivotally mounted in a bracket 38 secured to a cross beam 39 connected between front and rear angle iron members 40 and 41 at the base of the table and which extend between the end walls. The air cylinder 37 is of well-known type in which valves for admitting air to the respective ends of the cylinder to project and retract the piston rod are actuated by a solenoid or similar unit which, in turn, may be automatically controlled in the desired timed relation during each operative cycle of the machine. It is also pointed out that during the normal operating cycle, when the bars 19 are raised and lowered during a drape molding operation, the vacuum is applied when the bars reach their lowered position, i.e., the position where the heated thermo-plastic sheet is draped over the mold. Conveniently this operation may be initiated by suitable means connected to the cross bar 24 or other moving parts of the slide mechanism, so as to close a micro switch for the purpose of opening the vacuum valve. Inasmuch as such automatic controls are not a part of the present invention and are fully illustrated in the above referred to co-pending application, further illustration thereof is not deemed necessary.

The mechanism for raising and lowering the sheet holding frame is such that perfect synchronism between the frame supporting bars 19 at each end is obtained through the common crank shaft 32. The arrangement also results in a smooth and even draping action, the toggle action employed in the raising and lowering mechanism providing a smooth uniform stroke wherein the minimum pressure will be in the elevated position of the sheet holding frame at the time the plastic material is above the mold. As the material is pulled down over the male mold it has a tendency to cool, which increases the pressure required. With the toggle action, the pressure increases as the frame is lowered, so that at the bottom of the stroke it reaches the maximum pressure, many times that of the original pressure. This pressure is of sufficient order so that the plastic material cannot resist it and the frame will always bottom to a point of seal-off so that the vacuum can then draw the part regardless of the resisting force of the plastic material.

The sheet holding clamping frame is of generally rectangular shape and consists of a lower clamping frame part, indicated generally as 42, which normally remains in a horizontal position, and an upper clamping frame part 43 which is adapted to be relatively moved to open and closed positions with respect to the lower frame part, the clamping frame assembly being mounted upon the bars 19 of the raising and lowering mechanism for vertical adjustment, as will presently more fully appear. The lower frame part 42 comprises a longitudinal front bar 44 of rectangular cross section fixedly secured at its respective ends to transverse end bars 45—45 by means of screws 46 (Figs. 6 and 7). Each of the end bars 45 is supported upon a pair of vertical screws 47—47, each having a stud end 48 engaged through a hole 49 in the bar and secured by a cross pin 50. The screws are engaged through vertical passages 51 in lug extensions 52 at the respective ends of the bar 19, and are vertically adjustable therein by means of a pair of nuts 53 and 54 engaged at the upper and lower sides of the respective lug extensions. By backing off the nuts 54 which act as lock nuts, the nuts 53 may be turned in one or the other direction to raise or lower the screws, thus raising or lowering the clamping frame to the desired height above the mold supporting platen.

Upon the inner side of each of the end bars 45 there is secured a track bar 55 extending from the inner face of the front bar 44 to the rearward ends of the end bars and which provide guides for the rear bar 56 of the lower clamping frame part, and which is adjustable forwardly and rearwardly with respect to the front bar 44. For this purpose, the rear bar 56, as seen at the right hand portion of Fig. 2, is provided at each of its ends with a right-angular notch 57 engaged with the top and side of the track bar 55, a retaining block 58 being welded to the under side of the end of the bar 56 and projecting beneath the notch 57 to engage the under side of the track bar. A pair of transverse lower clamping bars 59—59 are connected between the fixed front bar 44 and the adjustable rear bar 56 and are adjustable longitudinally of the front and rear bars to thus define with them the rectangular space spanned by the thermo-plastic sheet 60 when the latter is clamped within the frame, this space being adjustable through the transverse forward or rearward adjustment of the rear bar 56 and the longitudinal adjustment of the transverse clamping bars 59 toward or away from each other, to thus provide for the clamping of sheets of widely varied size. The dot-and-dash lines in Fig. 1 indicate the adjusted position for a relatively small sheet while the full lines represent the position for a relatively large sheet.

For the purpose of adjustably securing the transverse clamping bars 59, the front bar 44 has mounted upon its upper surface a retaining bar 61 of the same width as the front bar, and a spacing bar 62 of slightly narrower width, the two bars 61 and 62 being secured by a series of screws 63 with the longitudinal edges of the bar 61 in aligned relation with the longitudinal edges of the front bar, and with the inner edge of the bar 62 inwardly offset from the inner edges of the bars 44 and 61, so as to provide a longitudinal groove 64 at the inner edge of the front bar. Each of the transverse clamping bars 59 is provided at its forward end with a lug projection 65 slidably engaged in the groove 64, a U-shaped clamping member 66 being welded or otherwise suitably secured to the under side of the bar 59 adjacent the lug projection 65 and extending beneath and to the forward side of the front bar 44, being secured in adjusted position by a clamping screw 67 provided in its forward portion and which is clampingly engaged against the forward side of the front bar 44. It is pointed out that the upper surface of the retaining bar 61 and the upper surfaces of the transverse bars 59 are in a flush plane and constitute the upwardly disposed forward and side surfaces of the lower clamping frame upon which the forward and side marginal portions of the plastic sheet 60 are engaged.

The rear ends of the transverse clamping bars 59 extend over the upper sides of the rear bar 56 and are each secured by a screw 68 engaged through one of a series of countersunk holes 69 extending longitudinally of the transverse clamping bar and screwed into one of a series of threaded screw holes 70 extending longitudinally of the rear bar. Centrally of the rear bar a spacer bar 71 is secured by screws 72—72, the length of the spacer bar 71 representing the minimum spacing of the transverse clamping bars 59 as shown, for instance, by the dot-and-dash lines. The screw holes 70 are disposed in equally spaced relation at each side of the spacer bar 71, and spacer blocks 73 having centrally disposed countersunk screw-receiving holes 74 are placed between the ends of the spacer bar 71 and the transverse clamping bars 59 and are secured by screws 74a engaged in the holes 74 and screwed into the threaded holes 70. The upper surfaces of the spacer bar 71 and the blocks 73 are in the same flush plane as the upper surfaces of the front bar 44 and the transverse bars 59, and provide the upwardly directed rearward surface of the lower clamping frame for engaging the rearward marginal portion of the plastic sheet 60.

In order to decrease the distance between the transverse clamping bars in increments corresponding to the width of the respective spacer blocks 73, which may, for instance, be one inch, the desired number of blocks are removed by removing the screws 74a, and the transverse clamping bars are then shifted to the desired position after first loosening the clamping screws 67 to disconnect them from the front bar 44. In order to adjust the position of the rear bar 56 transversely of the frame the screws 68 are loosened, and upon shifting of the rear bar to the desired position along the transverse clamping bars are screwed into the two longitudinally aligned screw holes 69 of the transverse clamping bars in register with the adjusted position. Like the threaded holes 70, the countersunk holes 69 are equally spaced, as for instance, at distances of one inch apart. Preferably, the spacer blocks 73 are one-half the width of the transverse clamping bars 59 so that each of the latter may be moved to any selected adjusted position simply by removing two of the spacer blocks to provide a space to receive it.

The upper clamping frame part 43 is substantially like the lower clamping frame part 42, but its parts are arranged in inverted relation so as to present a downwardly directed clamping face to cooperate with the upwardly directed clamping face of the lower clamping part, and it is of greater length so that its ends project beyond the ends of the lower clamping part, for a purpose presently to more fully appear. It comprises a longitudinal front bar 75 of rectangular cross-section fixedly secured at its respective ends to transverse end bars 76—76 by means of screws 77 (Figs. 6 and 7). Upon the inner side of each of the end bars 76 there is secured a track bar 78 extending from the inner face of the front bar 75 to the rearward ends of the end bars, the two track bars providing guides for the rear bar 79, which is adjustable forwardly and rearwardly with respect to the front bar 75. For this purpose the rear bar 79, as seen at the right hand portion of Fig. 2, is provided at each of its ends with a right-angular notch 80 engaged with the top and side of the track bar 78, a retaining block 81 being welded to the under side of the end of the bar 79 and projecting beneath the notch 80 to engage the under side of the track bar.

A pair of transverse upper clamping bars 82—82 are connected between the fixed front bar 75 and the adjustable rear bar 79 and are adjustable longitudinally of the front and rear bars to thus define with them the rectangular space spanned by the thermoplastic sheet 60 when the latter is clamped within the frame, this space, as previously pointed out with respect to the lower clamping bars, being adjustable through the transverse forward or rearward adjustment of the rear bar 79 and the longitudinal adjustment of the transverse clamping bars 82 toward or away from each other. The upper side of each of the clamping bars 82 is bevelled along its inner edge, as at 83, and the under side is recessed adjacent its outer edge, as at 84, to provide a relatively narrow clamping jaw for cooperation with the transverse clamping bar 59 of the lower clamping frame part in clamping the plastic sheet 60.

For the purpose of adjustably securing the transverse clamping bars 82, the front bar 75 has mounted on its under surface a retaining clamping bar 85 of greater width than the front bar 75 and a spacing bar 86 of narrower width than the front bar, the two bars 85 and 86 being secured by a series of screws 87, with the longitudinal outer edges of the bars 85 and 86 in alignment with the longitudinal outer edge of the front bar 75, with the longitudinal inner edge of the bar 86 inwardly offset from the longitudinal inner edge of the bar 75, and with the longitudinal inner edge of the bar 85 outwardly offset from the inner longitudinal edge of the front bar 75, thus providing a longitudinal groove 88 at the inner edge of the front bar. The retaining clamping bar 85 is bevelled at its upper side along its inner edge, as at 89, and is provided with a series of longitudinally spaced vertically disposed threaded holes 90 in which threaded plugs 91 may be engaged when desired, for the purpose of providing retaining projections for slight embedding into the clamped plastic sheet, the lower ends of the plugs being pointed for this purpose.

Each of the transverse clamping bars 82 is provided at its forward end with a lug projection 92 slidably engaged in the groove 88, a U-shaped clamping member 93 being welded or otherwise suitably secured to the upper side of the clamping bar 82 adjacent the lug projection 92 and extending over and to the forward side of the front bar 75, being secured in adjusted position by a clamping screw 94 provided in its outer portion and which is clampingly engaged against the forward side of the front bar 75. It is pointed out that the under surface of the retaining clamping bar 85 and the under surfaces of the transverse clamping bars 82 are in a flush plane and constitute the downwardly disposed forward and side surfaces of the upper clamping frame part for clamping engagement with the forward and side marginal portions of the plastic sheet 60 supported upon the lower frame part.

The rear ends of the transverse clamping bars 82 extend beneath the rear bar 79 and are each secured by a screw 95 engaged in one of a series of countersunk holes 96 in the rear bar 79 and screwed into one of a series of threaded holes 97 in the transverse clamping bar 82. Threaded plugs 98 (Fig. 2) pointed at their lower ends may be engaged in the threaded holes, when desired, for the purpose of providing retaining projections for slight embedding into the clamped plastic sheet.

Centrally of the rear bar 79, a spacer bar 99 is secured by screws 100, this spacer bar being aligned at its inner edge with the inner edge of the spacer bar 71 of the lower clamping frame part and being bevelled at its upper side adjacent its inner edge as at 101. The countersunk holes 96 are disposed in equally spaced relation at each side of the spacer bar 99, and spacer blocks 102 placed between the ends of the spacer bar 98 and the transverse clamping bars 82 are secured by screws 103 engaged through the countersunk holes 96 in the rear bar 79 and secured into centrally disposed threaded holes 104 in the spacer blocks. The spacer blocks are bevelled as at 105 at their upper sides adjacent their inner edges to conform and align with the bevelled inner edges of the spacer bar 99, the bevelled end portions of the spacer bar and the spacer blocks projecting inwardly from the inner side of the rear bar 79 with their inner edges vertically aligned with the inner edges of the spacer bar 71 and the spacer blocks 73 of the lower clamping frame part. The width of the spacer blocks 102 corresponds to the width of the spacer blocks 73 so that the transverse clamping bars 82 of the upper clamping frame part may be adjusted in exact correspondence to the adjustment of the transverse clamping bars 59 of the lower clamping frame part.

In the projecting portion of each of the spacer blocks there is provided a vertically disposed threaded hole 106, and in the spacer bar 99 there are provided a plurality of threaded holes 106a spaced to correspond with the spacing of the holes 106 in the spacer blocks. Each of these holes may, when desired, be engaged by a threaded plug 107 having a pointed lower end to provide projecting retaining points for slight embedding in the rearward marginal portion of the plastic sheet 60. The lower surfaces of the spacer bar 99 and the spacer blocks 102 are in the same flush plane as the lower surfaces of the front clamping bar 85 and the transverse clamping bars 82, and provide the downwardly directed rearward surface of the upper clamping frame part for engaging the rearward marginal portion of the plastic sheet 60 supported upon the lower clamping frame part.

The adjustment of the rear bar and the transverse clamping bars of the upper frame part is accomplished in substantially the same manner as the adjustment of the corresponding parts of the lower clamping frame part, the spacing of the holes 96 in the rear bar 79 and the holes 97 in the transverse clamping bars corresponding to the spacing of the holes 70 of the rear bar 56 and the holes 69 of the transverse clamping bars 59 of the lower frame part.

It is pointed out that the front bars 44 and 75 of both the bottom and top clamping frames are fixed in alignment to each other and are square with the table of the machine, thus having a fixed relationship to the vacuum opening 16 and to the forward position of the heater, with the result that the front portion of the mold positioned over the vacuum opening will always be in the same relative position on the machine. In addition, the transverse end bars 45 and 76 of the bottom and top frames are in fixed right-angular relation to the fixed front bars, so that the fixed three sides of each of the frames provide squared supports for the adjustable rear bars 56 and 79 and the adjustable transverse clamping bars 59 and 82.

This means that three things may be accomplished—(1) the need for squaring the frames is eliminated because the frames have the three sides as reference points for the adjustment of the adjustable parts; (2) the reach necessary to place a plastic sheet in the machine is reduced since the front bars are in their foremost position irrespective of the adjusted size of the clamping frames; and (3) the rear bars and the transverse clamping bars may be slidably adjustable and fixed at predetermined points of adjustment in squared relationship in the frames so that proper alignment of the frames may be maintained without the possibility of faulty adjustment.

The bevelling of the four sides of the upper clamping frame is such that heat blocking at the edges of the plastic sheet is prevented, so that the possibility of edge cooling of the sheet during the heating cycle is minimized. As before pointed out, the pointed threaded plugs 91, 98 and 107 in the respective front, sides and rear of the upper clamping frame may be used to hold difficult or highly oriented plastic sheets during the heating cycle. In the case of the plugs engaged in the transverse clamping bars 82, these will coincide with the countersunk holes 69 in the lower transverse clamping bar 59 so that if soft material is used the plugs will not contact the clamping surface of the lower frame and keep the upper frame from moving to its full clamping position. In the case of the spacer blocks 102, the plugs 107 engaged therein will coincide with the screw-receiving holes 74 in the spacer blocks 73 of the rear clamping bars, the heads of the screws 74a being downwardly offset in the holes to provide clearance for the pointed ends of the plugs to prevent contact with the clamping surface of the rear bar of the lower frame. In the case of the plugs 107 engaged in the spacer bar 99 and the plugs 91 engaged in the front clamping bar, where no registering holes are provided in the respective underlying lower clamping bars, a countersink recess 108 is made in the lower clamping bar directly under each plug to provide the same function of preventing contact with the clamping surface of the lower frame.

The drive means for the clamping frame for imparting opening and closing movement to the upper clamping frame part with respect to the lower clamping frame part, consists of identical air cylinder actuated means at each end of the clamping frame so connected that their movements are synchronized to impart identical movement to each end, thus preventing any possibility of longitudinal tilting and consequent jamming of the clamping action.

A vertically disposed depending bracket plate 109 is secured, as by welding, to the outer side of each transverse end bar 45 at a point approximately centrally between the front and rear ends thereof, and at its lower end is provided with an open-ended box-like structure formed by a yoke member 110 secured to the face of the plate 109. Within this box-like structure there is pivotally mounted the upper end of the air cylinder 111 of a power unit including a reciprocating piston rod 115, the pivot mounting consisting of a cross pin 112 secured to the upper end of the cylinder and having rotary bearing in bearing holes 113 and 114 respectively in the plate 109 and the yoke member 110. The reciprocating piston rod 115 of the power unit for imparting movement to the upper clamping frame part extends from the air cylinder through the cross pin 112 and is provided at its upper end with a U-shaped clevis member 116, to which the lower end of an arm 117, secured as by welding to the transverse end bar 76 of the upper clamping frame part, is pivotally connected by a shaft 118.

At the rearward end of the transverse end bar 45 of the lower clamping frame part there is secured an L-shaped bracket 119, to the outer side of which there is pivotally connected by a pivot stud 120 one end of a link member 121, the other end of which is connected to the shaft 118 of the clevis 116 and whereby, as the piston rod is extended from the closed position of the clamping frame as seen in Fig. 6 to the open position as seen in Fig. 7, the air cylinder 111 is pivotally moved about the axis of the cross pin 112. A compensating control bar 122 is pivotally connected at its forward end by a pivot pin 123 to the arm 117 at a point between the upper clamping frame part and the clevis 116, and has secured to its rearward end a right-angularly extending arm 124 disposed at the inner side of the vertical portion of the bracket 119 and rigidly connected to a shaft 125 rotatably engaged at each of its ends in bearing holes 126 in the respective brackets 119 at each end of the clamping frame.

Through the control bars at each end, which are connected through the shaft for identical movement with each other, identical movement is imparted to each end, even though there may be slight variance in the actuation of the air cylinders, although these are under normal conditions so controlled that the valves admitting air thereto are actuated simultaneously and equally. Also, the control bars 122 impart relative swinging movement to the upper clamping frame as it moves between open and closed positions, the arcs through which the axes of the pivot connections 123 of the bars 122 and the pivot connections 118 of the clevis 116 move being so related that the movement of the upper clamping frame as it approaches the lower clamping frame during the closing movement, or moves away from it during the opening movement, is in a substantially vertical direction, thus obtaining a uniform clamping action on all four sides of the clamping frame with respect to the plastic sheet, whether the latter be of relatively thin or relatively heavy gauge. This is also true with respect to the clamping of either large or small sheets, the substantially vertical clamping movement being obtained whether the rear bars are adjusted to a point close to the front bars, as indicated by the dot-and-dash lines in Fig. 1, or adjusted to their position at the rearward end of the frame, as shown by the full lines.

Also the opening movement is such that the forward end of the frame is open to a greater extent than the rearward end of the frame so as to facilitate placing of the plastic sheet in position for removal of the molded piece. As distinguished from previous clamping frames, in which the upper clamping frame part is hinged at the rear to the lower clamping frame part, the present arrangement provides a substantially wide open space at the rear in the open position as seen in Fig. 7.

Upon the outer side of the transverse end bar 45 at one end of the frame, there is provided a push button switch 127 which is connected to the control means for moving the heater into heating position above the clamping frame, so that at the moment of closing of the clamping frame, as seen in Fig. 6, the heater will automatically move into superimposed heating position.

In order to control the point at which the frame opens following a molding operation where the frame is moved upwardly and downwardly during drape molding, a cam 128 is mounted for vertical adjustment upon a vertical bar 129 secured to the side of the yoke member 110 at one end of the machine, the position of adjustment being fixed by a set screw 130. This cam is adapted to operate a switch 131 which controls the valve for causing the air cylinder 111 to extend the piston rod to open the clamping frame. Thus by adjusting the position of the cam, the point at which the frame is opened may be predetermined so that in the case of a relatively deep mold the molded piece may be entirely removed from the mold before the frame opens.

What is claimed is:

1. In a molding machine of the character described, a horizontal mold supporting table, a pair of clamping frames supporting transverse horizontal bars above said table, one adjacent each end of said table, raising and lowering means carried by said table for imparting simultaneous and equal rectilinear vertical movement to said support bars relative to said table, a clamping frame for a sheet of material to be molded, comprising a horizontal lower clamping frame part and an upper clamping frame part movably supported upon said lower frame part for opening and closing movement relative thereto; and vertically adjustable means supporting said lower frame part at its respective ends upon said respective support bars and adapted to adjust the vertical distance between said lower frame part and said table in the respective raised and lowered positions of said clamping frame supporting bars.

2. In a molding machine of the character described, a table, a clamping frame raising and lowering means carried by said table, a clamping frame for a sheet of material, a clamping frame opening and closing means, and means for controlling the actuation of said opening and closing means to open said clamping frame comprising a first part carried by said table, and a second part carried by said clamping frame for actuating contact with said first part at a point in the raising movement of said clamping frame, one of said parts being vertically adjustable to selectively predetermine the point of said raising movement at which said clamping frame is opened.

3. In a molding machine of the character described, a clamping frame for a rectangular sheet of material, comprising a lower rectangular clamping frame part for engaging the lower side of the four marginal edge portions of said material and an upper rectangular clamping frame part for engaging the upper side of said edge portions in vertically opposed relation to said lower clamping frame part, each of said parts including a pair of transverse parallel end bars, a longitudinal front clamping bar fixedly secured at its ends to said end bars, a rear clamping bar parallel to said front bar, connection means at the respective ends of said rear bar connected to said respective end bars for adjustment longitudinally of said end bars, a pair of transverse clamping bars between and parallel to said end bars, connection means at the forward ends of said transverse clamping bars connected to said front bar for adjustment longitudinally of said front bar, connection means for securing said transverse clamping bars at selected points of their length to said rear bar at selected points of its length, said transverse bars of said lower frame part being above said rear clamping bar thereof and having their upper surfaces flush with the upper surface of said front clamping bar thereof, and said transverse bars of said upper frame part being below said rear clamping bar thereof and having their lower surfaces flush with the lower surface of said front clamping bar thereof, a series of spacer block members removably secured to said rear clamping bar of said lower frame part having their top surfaces flush with the top surfaces of said transverse bars of said lower frame part, a series of spacer block members removably secured to said rear clamping bar of said upper frame part having their top surfaces flush with the lower surfaces of said transverse bars of said upper frame part, supporting means connected to said end bars of one clamping frame part to support it in clamping position, and means connected to the end bars of the other clamping frame part to move it into clamping relation with said one clamping frame part.

4. In a molding machine of the character described, a horizontal mold supporting table, a clamping frame for a sheet of material to be molded comprising a horizontal rectangular lower frame part supported at the upper side of said table, and including transverse end bars and longitudinal front and rear bars, and a rectangular upper frame part, including transverse end bars and longitudinal front and rear bars and means at each end of said clamping frame for moving said upper frame part into a closed position in parallel material clamping relation to said lower frame part and into an inclined forwardly divergent open position above said lower frame part, with said rear bar of said upper frame part substantially spaced above said rear bar of said lower frame part, said means each comprising a link member having fixed axis pivot connections at its respective ends with a respective end bar of said upper frame part at a point substantially midway between its ends and with the corresponding end bar of said lower frame part at a point substantially contiguous to one end thereof, a control bar having fixed axis pivot connections at its respective ends with said respective end bar of said upper frame part and with said corresponding lower frame part at points removed from said pivotal connections of said link member whereby said upper frame part remains rigid with respect to said lower frame part in any position of said upper frame part, said pivot connections of said link member and control bar being so spaced with respect to each other that said upper frame part assumes said parallel relation to said lower frame part in its closed position and assumes said inclined forwardly divergent position in its open position, and means for imparting opening and closing movement to said upper frame part.

References Cited in the file of this patent

UNITED STATES PATENTS

| | | |
|---|---|---|
| 1,918,888 | Aska | July 18, 1933 |
| 2,240,010 | Bosomworth | Apr. 29, 1941 |
| 2,285,389 | Bostwick | June 9, 1942 |
| 2,301,125 | Kramp et al. | Nov. 3, 1942 |
| 2,318,310 | Heintz | May 4, 1943 |
| 2,340,191 | Kuhlke | Jan. 25, 1944 |
| 2,424,915 | Bosomworth et al. | July 29, 1947 |
| 2,454,437 | Ehnborn | Nov. 23, 1948 |
| 2,700,179 | Benson | Jan. 25, 1955 |
| 2,759,217 | Petterson | Aug. 21, 1956 |
| 2,765,493 | Windstead | Oct. 9, 1956 |
| 2,771,619 | Stewart | Nov. 27, 1956 |